2 Sheets--Sheet 1.
E. W. STANTON & T. M. RILEY.
Commode-Ventilator.
No. 167,032.　　　*Fig. 1.*　　　Patented Aug. 24, 1875.
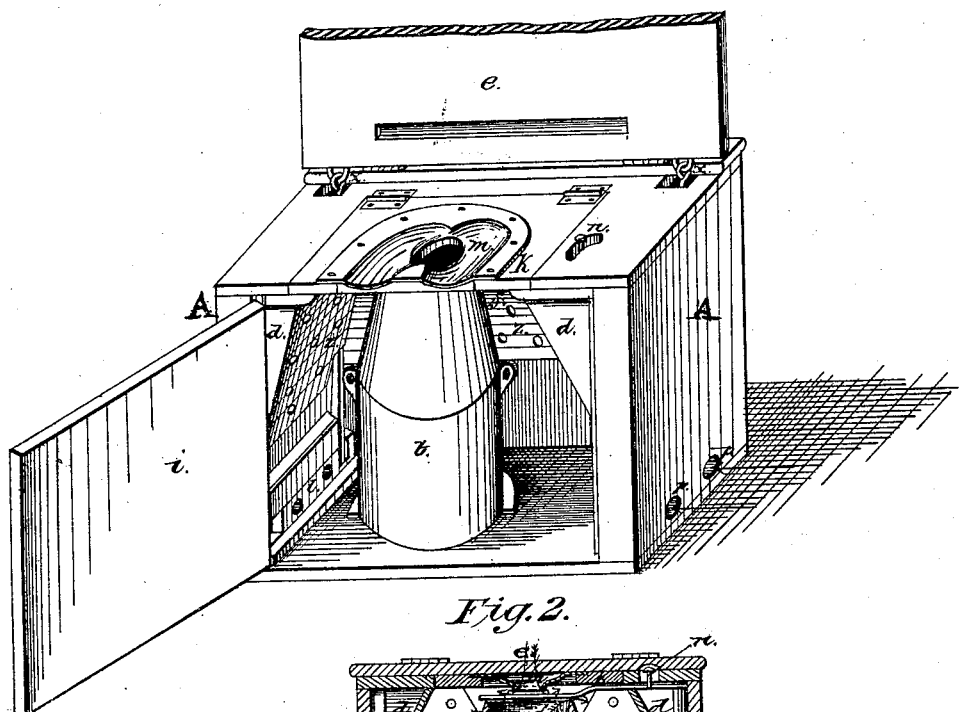
*Fig. 2.*
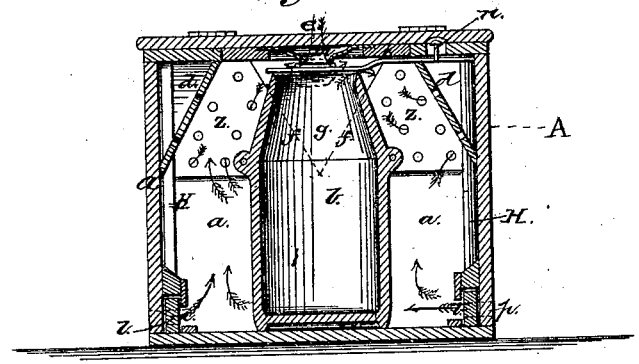
*Fig. 3.*
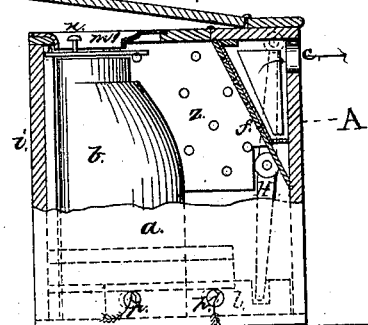
Attest:
Thomas B. Dewley.
George C. Hetzel.
Inventor's:
Edward W. Stanton
Thomas M. Riley
Stephen Ustick Attorney
N. PETERS, PHOTO-LITHOGRAPHER, WASHINGTON, D. C.

2 Sheets--Sheet 2.

E. W. STANTON & T. M. RILEY.
Commode-Ventilator.

No. 167,032. Patented Aug. 24, 1875.

Witnesses.
Thomas J. Bewley.
George C. Hetzel.

Inventors
Edward W. Stanton
Thomas M. Riley
Stephen Ustick attorney

N. PETERS, PHOTO-LITHOGRAPHER, WASHINGTON, D. C.

UNITED STATES PATENT OFFICE.

EPHRAIM W. STANTON AND THOMAS M. RILEY, OF PHILADELPHIA, PA.

IMPROVEMENT IN COMMODE-VENTILATORS.

Specification forming part of Letters Patent No. 167,032, dated August 24, 1875; application filed January 28, 1874.

*To all whom it may concern:*

Be it known that we, EPHRAIM W. STANTON and THOMAS M. RILEY, of the city and county of Philadelphia, in the State of Pennsylvania, have invented an Improvement in Commodes, of which the following is a specification:

Our invention consists, in the first place, in the construction of the case with inlet-openings for the passage of air into the pot-compartment, and valves for regulating the draft, in combination with an air-chamber which partly surrounds said compartment, being divided therefrom by perforated partitions, through which the odor is caused to pass by the draft and escape into a sensitive-valve chamber, and from thence through a pipe into a chimney or other flue.

In the second place, the invention consists in a jointed connection of the above-mentioned valves with the lid of the commode, whereby they are automatically closed by the opening of the lid to cut off the draft, and thus prevent the odor being forced from the commode into the room, and are opened by the closing of the lid for the admission of air for the ventilation of the commode.

In the third place, the invention consists of a swinging valve for covering the mouth of the pot before closing the lid of the commode, to prevent the contact of the foul air therewith, the valve being closed by means of the device which operates the valves of the inlet-openings above mentioned.

In the fourth place, the invention consists of sensitive valves connected with the sensitive-valve chamber above mentioned, for closing the perforations through the partitions which separate it from the air-chamber, to prevent a back draft into said chamber, which would otherwise be caused by a sudden puff of air down the chimney or flue.

In the fifth place, the invention consists of a stamped seat, as hereinafter described.

In the sixth place, the invention consists of a perforated pot to provide for the draft through the commode, carrying off the odor therefrom, the perforations being so arranged as to be closed by the cover of the pot preparatory to its removal from the commode.

Figure 4:
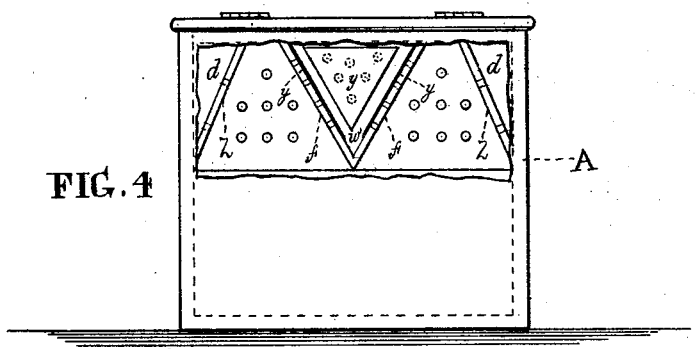
Figure 5:
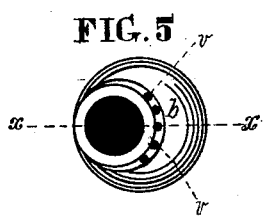
Figure 6:
Figure 7:
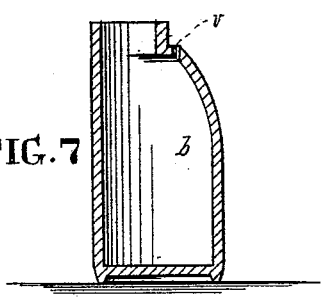

In the accompanying drawings, Figure 1 is a perspective view of our improved commode. Fig. 2 is a vertical longitudinal section of the same. Fig. 3 is an end view of the commode with the upper portion broken away to show the interior. Fig. 4, Sheet No. 2, is a rear view of the commode with a portion of the rear side broken away to exhibit the sensitive-valve chamber $w$. Fig. 5 is a top view of the pot $b$. Fig. 6 is a vertical section at the line $x\ x$ of Fig. 5. Fig. 7 is a vertical section of the pot-cover $u$.

Like letters of reference in all the figures indicate the same parts.

A is the box or case which constitutes the exterior of the commode, having a compartment which contains the pot $b$, which is provided with a cover, $u$, to prevent the odor escaping from the pot when the latter is carried away from the commode. There are perforations $v$, through which the odor passes from the pot when in its place, and is carried out into the chimney by the draft. The edge of the cover, before removing the pot, covers these openings to prevent the escape of the odor into the room. There are partitions $z$ which form a triangular space, $d$, around the ends and rear side of the pot-compartment $a$ of the case A. The said compartment $a$ is ventilated by the passage of air through the openings $p$ at the ends of the commode, the draft being regulated by means of the valves $t$; and the air is evenly distributed around the pot to carry off the odor by means of perforations in the partition $z$, through which it escapes into the air-space $d$, whence it passes through perforated partitions $f\ f$ into the triangular sensitive-valve chamber $w$ formed by said partitions. The perforations are provided with sensitive valves $y$ formed of flexible material, fastened at their upper ends to the partitions, which admits of their being raised by a draft from the commode, as it passes through the perforations, and of being closed by any slight puff of wind down the chimney, whereby a back draft into the commode is prevented. The perforations of the partitions $z$ should contain as much area in the aggregate as that of the valve-openings $p$; and the latter about one-half the area as that of the pipe-hole $c$ which leads from the sensitive-valve chamber into the chimney or flue, whereby to insure a rapid current of air through the commode for its ventilation. The valves $t$, for opening and closing the openings $p$, are automatically opened and closed by the opening and closing of the lid $e$ by means of the vertical levers H, which have links $x$ at their upper ends that are jointed to the lid, and a joint connection at their lower ends with the valves, as seen in Fig. 2. The swinging valve $m'$, over the mouth of the pot $b$, should be opened after the person is seated by pressing against the knob $n$ with the left hand, and closed again by a reverse movement before rising from the seat. Should the person forget to do this the valve is closed by one of the vertical levers H in its downward movement as the lid is closed. The same attachment can be applied to open the valve should it be desired. $m$ is a seat, which is stamped up out of any suitable materials by means of dies. The dies may be formed by taking a natural impression with plaster, or other suitable material, whereby the form may be expeditiously obtained. It is attached to inside lid K.

We claim as our invention—

1. A commode having inlet-passages provided with valves for regulating the passage of air into its interior, around the pot, and outlet-passages communicating with a chimney or flue, for the purpose of ventilating the commode, substantially as set forth.

2. The combination of the vertical lever H and links $x$ with the lid $e$ and valves $t$, for the automatic opening and closing of the latter, substantially as set forth.

3. The swinging valve $m'$, in combination with the case A and pot $b$, for closing the mouth of the pot $b$, the valve being closed by the vertical lever H, substantially as set forth.

4. The compartment $a$ having sensitive valves $y$ for preventing a back draft into the air-chamber $d$, substantially as set forth.

5. The stamped seat $m$ struck up by means of dies, substantially as set forth.

6. The pot $b$ having perforations $v$, in combination with the cover $u$, the said cover closing the perforations, substantially as and for the purpose set forth.

EPHRAIM W. STANTON.
THOS. M. RILEY.

Witnesses:
CHAS. JENNINGS,
M. F. OSLER,
S. W. RILEY.